(12) United States Patent
LaPanse

(10) Patent No.: US 6,563,666 B1
(45) Date of Patent: May 13, 2003

(54) DISC DRIVE MODEL REFERENCE SEEK ALGORITHM

(75) Inventor: Margot Ann LaPanse, Superior, CO (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/473,816

(22) Filed: Dec. 28, 1999

Related U.S. Application Data

(60) Provisional application No. 60/130,290, filed on Apr. 21, 1999.

(51) Int. Cl.[7] .............................................. G11B 5/596
(52) U.S. Cl. .................................... 360/78.09; 318/560
(58) Field of Search ....................... 360/78.09; 318/560, 318/561

(56) References Cited

U.S. PATENT DOCUMENTS

| | | | |
|---|---|---|---|
| 4,477,755 A | 10/1984 | Rickert | |
| 5,389,867 A | 2/1995 | Adachi et al. | |
| 5,483,438 A | 1/1996 | Nishimura | |
| 5,699,207 A | 12/1997 | Supino et al. | |
| 5,726,825 A | 3/1998 | Phan et al. | |
| 6,013,995 A | * 1/2000 | Kim | 318/561 |

FOREIGN PATENT DOCUMENTS

| | | |
|---|---|---|
| EP | 0 378 329 A2 | 8/1990 |
| EP | 0 614 174 A2 | 8/1990 |
| JP | 10-312656 | 5/1997 |

* cited by examiner

*Primary Examiner*—David Hudspeth
*Assistant Examiner*—Mitchell Slavitt
(74) *Attorney, Agent, or Firm*—Merchant & Gould P.C.

(57) ABSTRACT

Herein is disclosed a method and apparatus for controlling the excitation of a servomechanism in a disc drive with a low frequency stimulus, yet necessitating the control system to include only a model of the servomechanism's response to having been excited by a high frequency stimulus (square-wave). The invention uses a square wave as a feedforward input signal. This feedforward input signal is low-pass filtered and used as a stimulus to excite the servomechansim, during seek operations. The response of the servomechanism is measured at intervals. The response of the servomechanism is predicted, by a servomechanism model, as if the servomechanism had been excited by the feedforward square-wave signal, rather than its filtered counterpart. The predicted response of the servomechanism is then filtered, using a similar low-pass filter. The difference between filtered modeled responses and the measured responses are used to subsequently adjust the signal that stimulates the servomechanism.

25 Claims, 5 Drawing Sheets

DISC DRIVE MODEL REFERENCE SEEK ALGORITHM

RELATED APPLICATIONS

This application claims the benefit of the filing date of U.S. Provisional Patent Application Ser. No. 60/130,290 filed Apr. 21, 1999 and entitled "DISC DRIVE MODEL REFERENCE SEEK ALGORITHM."

FIELD OF THE INVENTION

This application relates to hard disc drives and more particularly to an apparatus and method for exciting a servomechanism in a disc drive with a low frequency signal, without necessitating the inclusion of a model of the servomechanism's response to the low frequency signal.

BACKGROUND OF THE INVENTION

The storage medium for a disc drive is a flat, circular disc capable of retaining localized magnetic fields. The data, that are stored upon the disc, find physical representation through these localized magnetic fields. The data are arranged on the disc in concentric, circular paths known as tracks.

The localized magnetic fields can be detected by a head when the field is brought in close proximity to the head. During operation the disc continually rotates, meaning that for each rotation, a head fixed a given radius from the center of the disc would encounter every localized magnetic field along a given track. Altering the radial coordinate of the head allows the head to read or write data along a different track.

The head is mounted upon an actuator arm that is rotated by a servo control system. Accordingly, the track position of the head is controlled by the servo system. When the head needs to access a different track, the actuator arm is rotated, bringing the head to the desired track position. The process of moving the head to a new track, referred to as seeking, includes an acceleration and a deceleration phase, and the period during which seeking occurs is known as the access time.

In a conventional disc drive, a seek operation is controlled by a feedback loop, and may additionally use feedforward, which has the benefit of allowing the control system to operate with a lower bandwidth. In such a disc drive, the control process typically works as follows. During the acceleration phase of the seek operation, a feedforward signal is used to excite the servo system, resulting in the head being accelerated along a circular arc. While the head is experiencing acceleration, its velocity and position are periodically measured, and these measurements are compared against target velocity and position values. The differences between the measured values and the target values are subsequently used to adjust the feedforward signal that excites the servo system.

During deceleration, a negative feedforward signal is used to excite the servo system, resulting in the head being decelerated. Once again, while the head is decelerated, its velocity and position are periodically measured, and these measurements are compared against target velocity and position values, the differences therebetween being used to subsequently adjust the feedforward signal that excites the servo system.

One cost effective means of implementing the above described control system is to use a square wave as the feedforward signal (with the positive portion of the wave correlating with acceleration, and the negative portion with deceleration). The advantage of doing this is that the feedforward signal can be generated from a single table stored in a memory device, as opposed to requiring a different table for each length of seek to be performed. Likewise, a similarly shaped tripartite waveform can be used as a feedforward signal, wherein the constant positive and negative portions of the signal are separated by a period of quiescence of equal duration. Acceleration, in such a waveform, would correspond to the positive going portion of the wave, deceleration with the negative going portion, and the quiescent portion (no output) would correspond with a coast state. Again, this feedforward signal could be generated from a single table. Accordingly, such an approach requires less memory space and therefore reduces the total cost of the disc drive.

The cost effective implementation just described possesses a disadvantage: since the feedforward signal used to excite the servo system is a square wave, it therefore contains high frequency components. The high frequency components of the square wave cause the actuator arm assembly to resonate, potentially producing errors. The high frequency components of the square wave are also associated with acoustic noise, meaning that the disc drive will be noisy during operation, an undesirable characteristic from a consumer standpoint.

SUMMARY OF THE INVENTION

The method and apparatus in accordance with the present invention solves the aforementioned problems and other problems by allowing the servomechanism to be excited by a low frequency stimulus, yet requiring the storage of a model of only the servomechanism's response to a high-frequency (square-wave) stimulus. The method involves filtering, with a first low-pass filter, a high frequency input signal, yielding a filtered input signal, which is used to excite the servomechanism. The various responses of the servomechanism are measured at intervals. The various responses to be measured may include head position or any number of its infinite derivatives (velocity, acceleration, etc.). Next, the various responses of the servomechanism to the unfiltered, high frequency input signal are modeled. The modeled responses of the servomechanism are then filtered with a low-pass filter, yielding filtered modeled responses. Finally, the filtered input signal is adjusted based upon the difference between the filtered modeled responses and the measured responses of the servomechanism.

The apparatus includes a first low-pass filter, for filtering a high frequency input signal, and yielding a filtered input signal. The filtered input signal is received by an adder (this being only one of its inputs), with its output being operably connected to a driver and a first input of a measuring module. The driver supplies current to the servomechanism, based upon the sum provided to it by the adder. The servomechanism receives the current, and being excited thereby is accelerated. This response is measured by a measuring module, which is coupled to the servomechanism. The apparatus also includes a servomechanism model which predicts the various responses of the servomechanism to having been excited by a high frequency stimulus (square-wave). The servomechanism model is connected to a low-pass filter module that attenuates the high frequency bands of the various modeled responses. An error signal-generating module receives the various filtered modeled responses as one input, and receives the various measured responses from the measuring module as another input, yielding an error output, which is provided as an input to a compensator. The compensator is designed to stabilize the control system, and has its output coupled, as an additional input, to the adder.

These and various other features as well as advantages which characterize the present invention will be apparent from a reading of the following detailed description and a review of the associated drawings.

DETAILED DESCRIPTION

Figure 1:
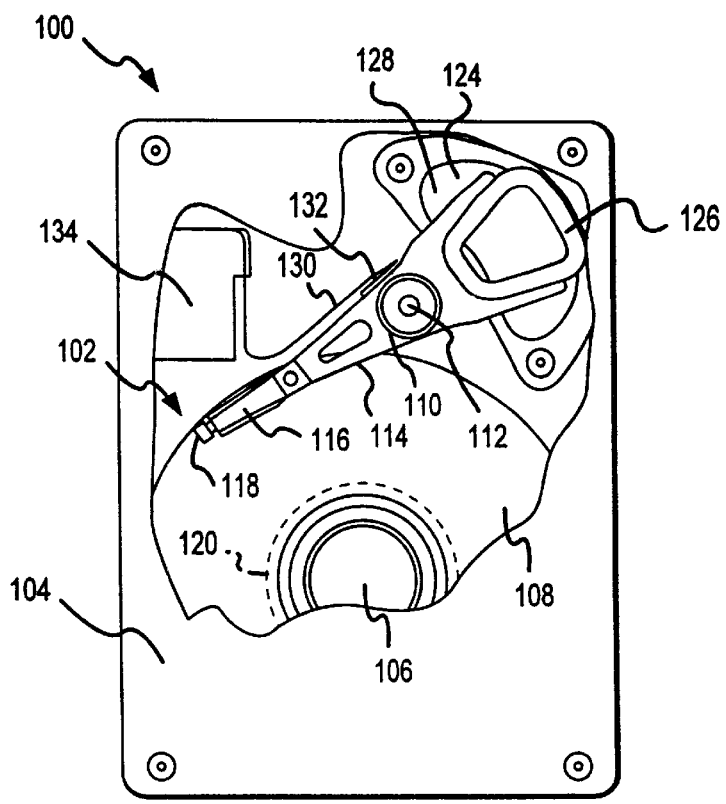
FIG. 1 is a schematic representation of a disc drive in accordance with a preferred embodiment of the invention.
Figure 2:
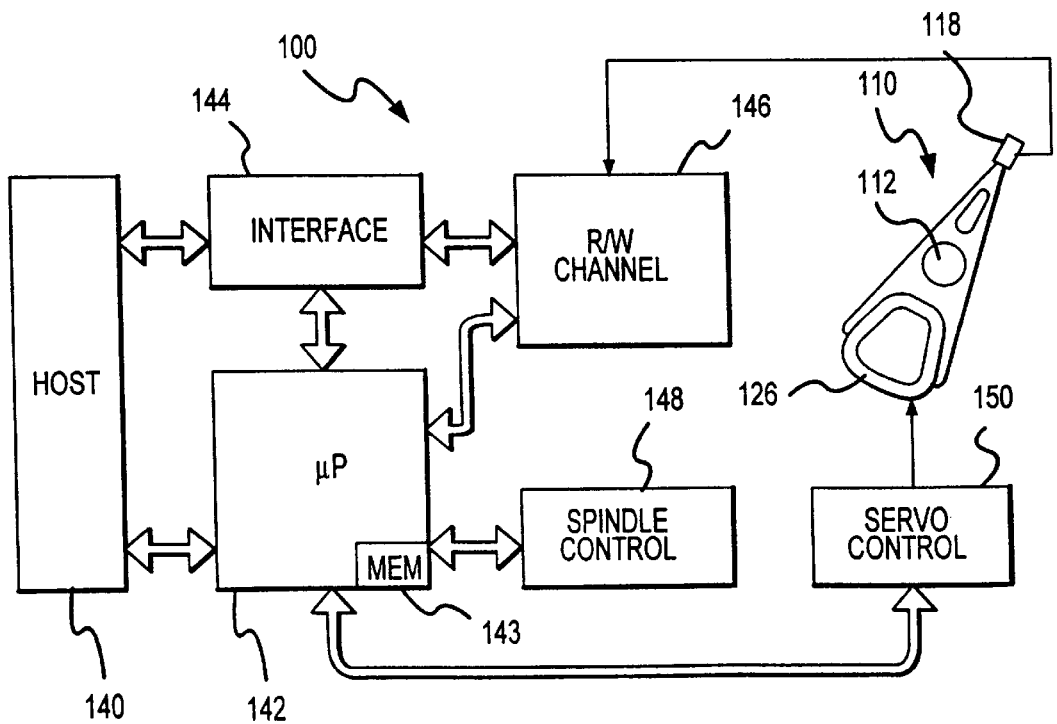
FIG. 2 illustrates a disc drive system connected to a host for the disc drive of FIG 1.
Figure 3:
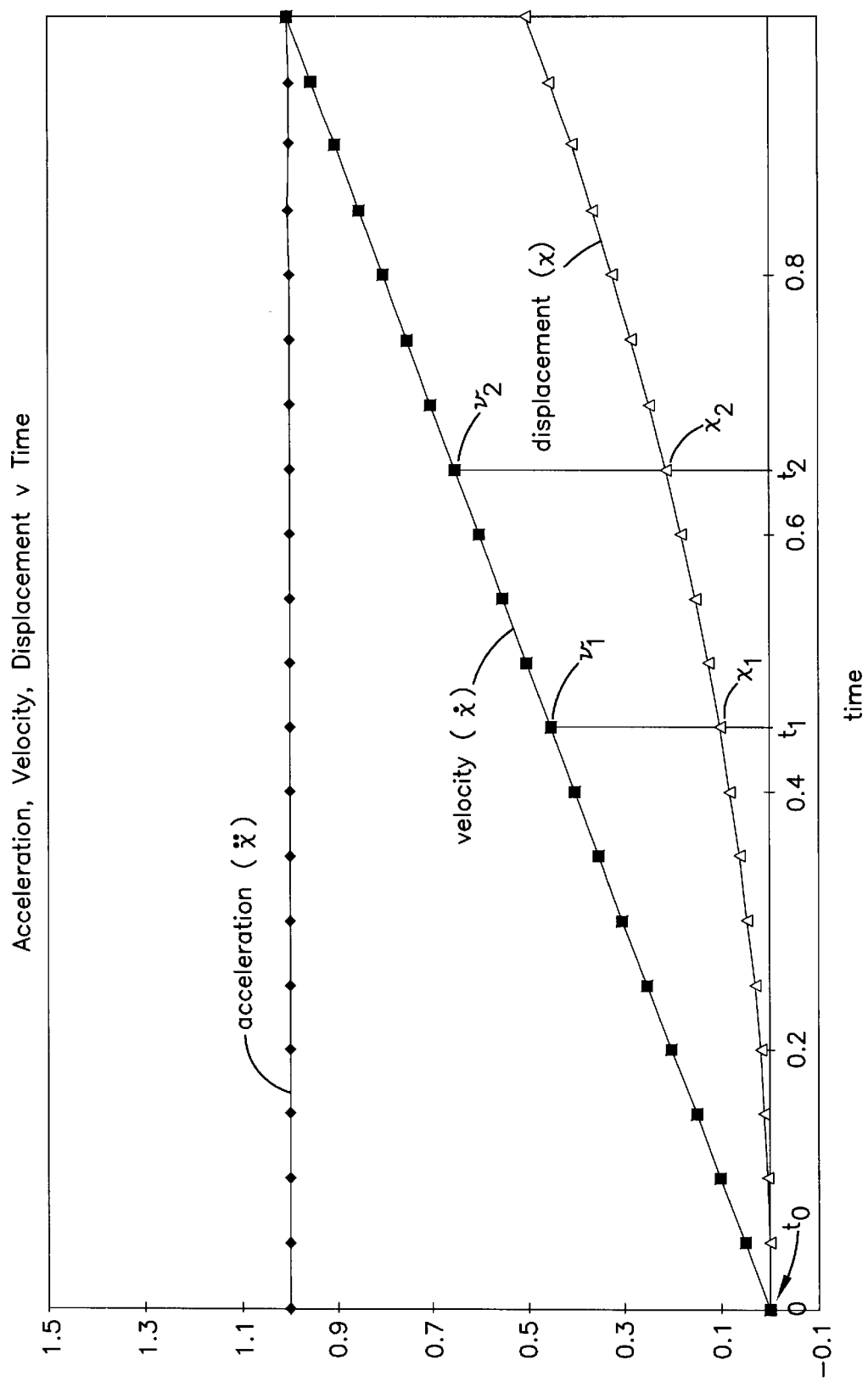
FIG. 3 depicts the expected time-domain progression of displacement and velocity of the head of a disc drive during a period of constant acceleration.
Figure 4:
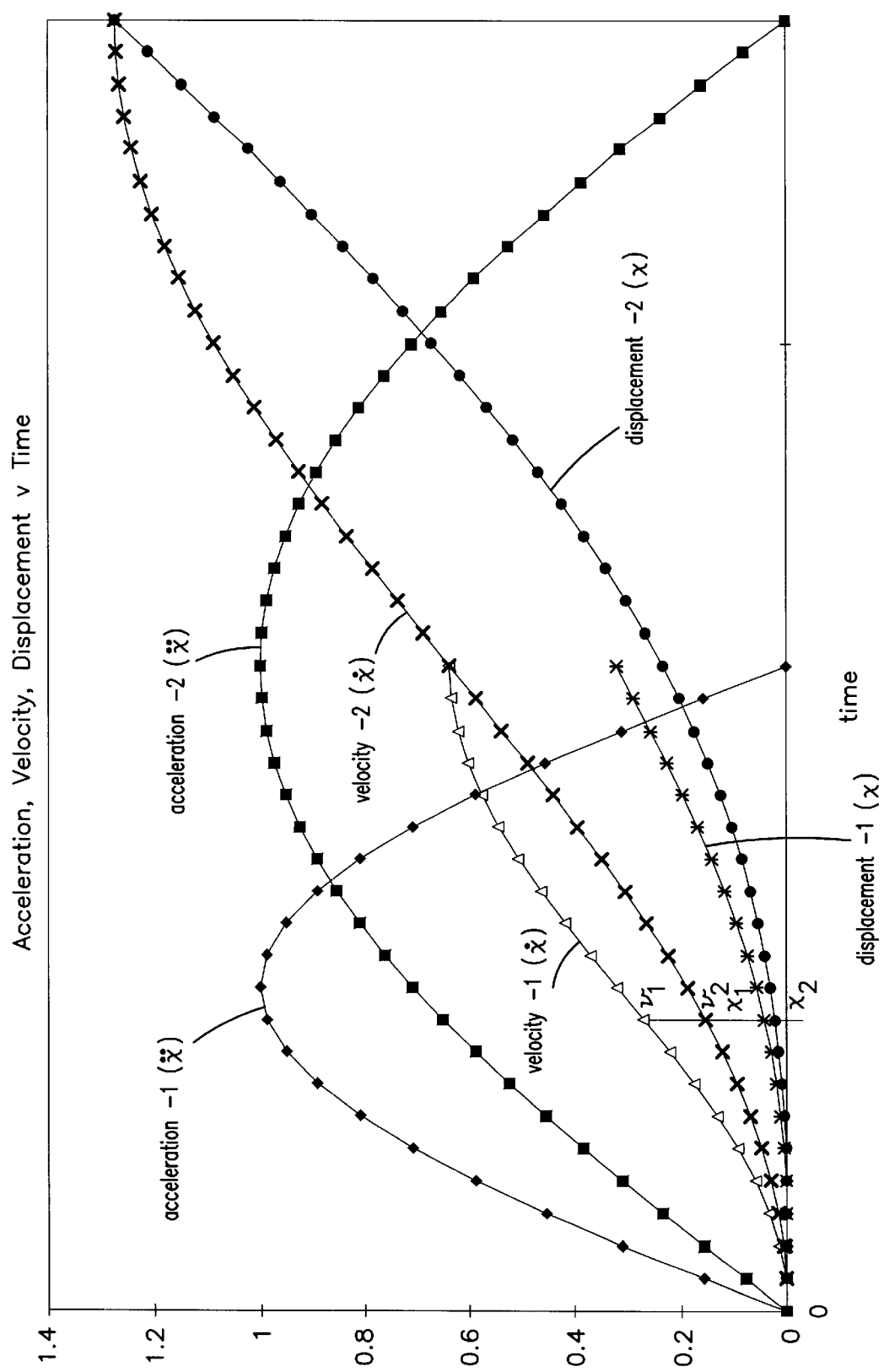
FIG. 4 depicts two expected time-domain progressions of displacement and velocity of a head of a disc drive during periods of band-limited acceleration.
Figure 5:
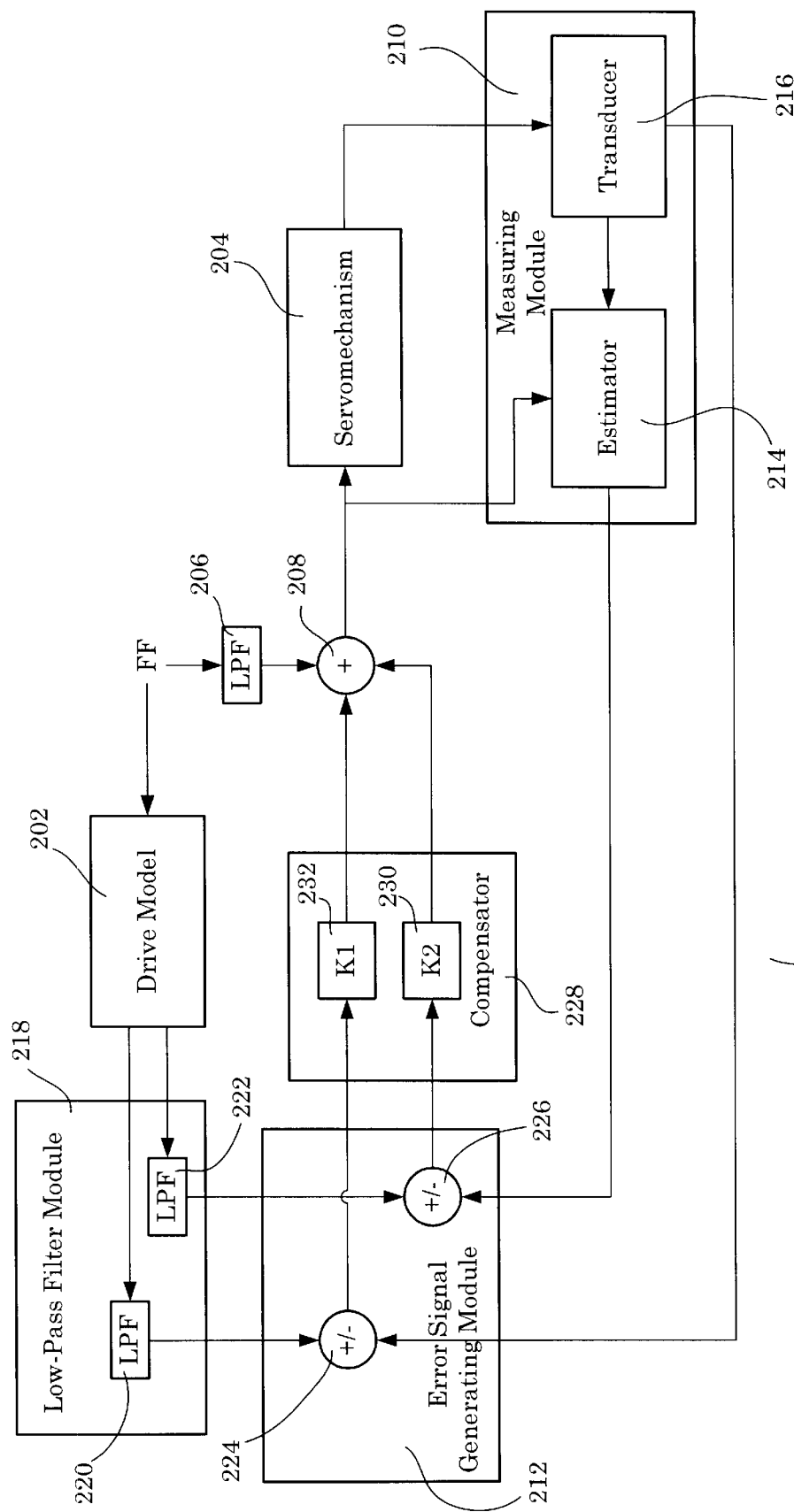
FIG. 5 is a control system in accordance with the present invention.
Figure 6:
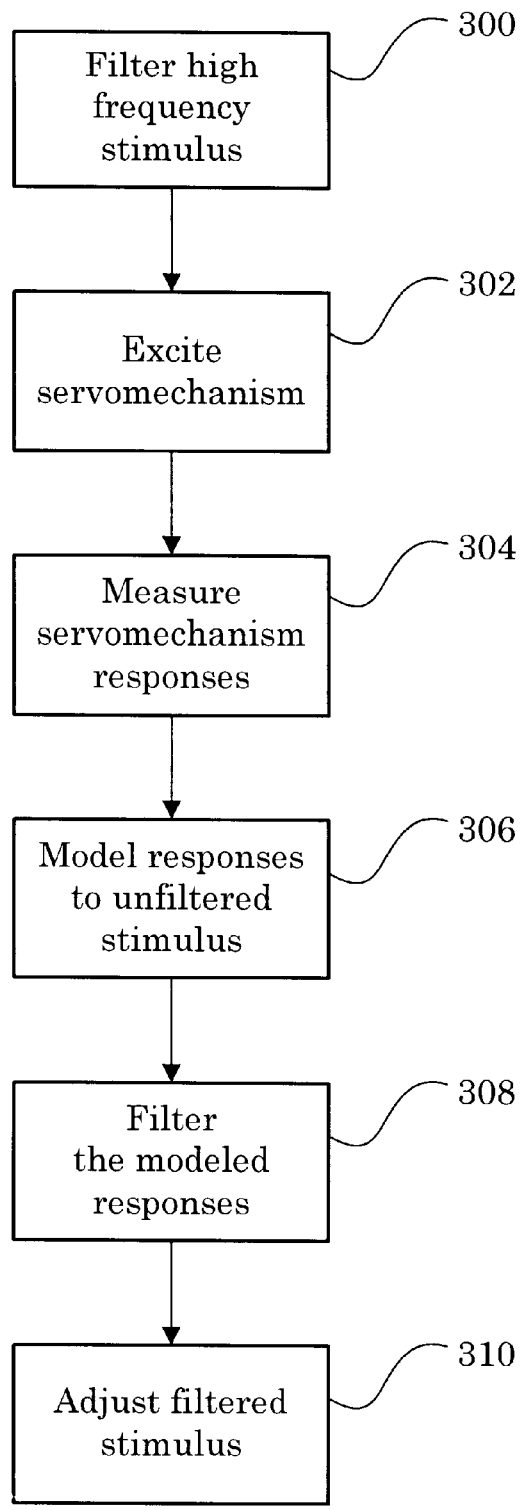
FIG. 6 is a method in accordance with the present invention.

In the following Detailed Description, the discussion associated with FIGS. 1 and 2 is intended to familiarize the reader with the major functional components of a disc drive. The discussion associated with FIGS. 3 and 4 provides context allowing the reader to appreciate the advantages of the subject invention, which solves the previously mentioned problem. Finally, FIGS. 5 and 6 are directed to the invention itself.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112, and the heads 118 are caused to move across the surfaces of the discs 108.

The spindle motor 116 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Referring now to FIG. 2, shown therein is a functional block diagram of the disc drive 100 of FIG. 1, generally showing the main functional circuits which are resident on the disc drive printed circuit board and used to control the operation of the disc drive 100. The disc drive 100 is shown in FIG. 2 to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

The discs 108 are rotated at a constant high speed by a spindle control circuit 148, which typically electrically commutates the spindle motor 106 (FIG. 1) through the use of back electromotive force (BEMF) sensing. During a seek operation, the track position of the heads 118 is controlled through the application of current to the coil 126 of the actuator assembly 110. A servo control circuit 150 provides such control. During a seek operation the microprocessor 142 receives information regarding the velocity and acceleration of the head 118, and uses that information in conjunction with a model, stored in memory 143, of the plant to generate the response of the servomechanism to a high frequency stimulus to communicate with the servo control circuit 150, which will apply a controlled amount of current to the voice coil motor 126, thereby causing the actuator assembly 110 to be pivoted.

Data is transferred between the host computer 140 and the disc drive 100 by way of a disc drive interface 144, which typically includes a buffer to facilitate high speed data transfer between the host computer 140 and the disc drive 100. Data to be written to the disc drive 100 are thus passed from the host computer to the interface 144 and then to a read/write channel 146, which encodes and serializes the data and provides the requisite write current signals to the heads 118. To retrieve data that has been previously stored by the disc drive 100, read signals are generated by the heads 118 and provided to the read/write channel 146, which performs decoding and error detection and correction operations and outputs the retrieved data to the interface 144 for subsequent transfer to the host computer 140. Such operations of the disc drive 100 are well known in the art and are discussed, for example, in U.S. Pat. No. 5,276,662 issued Jan. 4, 1994 to Shaver et al.

FIG. 3 depicts the expected time-domain progression of displacement and velocity of the head—mounted on the distal end of the servomechanism—during a period of constant acceleration. The velocity of the head is represented by the series labeled "velocity," and the acceleration of the head is represented by the series labeled "acceleration." In FIG. 3, at the time of commencement of acceleration the head has neither velocity nor displacement, but these conditions are not necessary for the principles discussed below to be applicable.

As is demonstrated in FIG. 3, the expected velocity of the head is governed by the relationship $v(t)=at$, wherein $v(t)$ represents the velocity of the head as a function of time, a represents the constant acceleration of the head, and t represents the duration for which the head has been accelerated. Displacement is governed by the relationship $x(t)=\frac{1}{2}at^2$, wherein $x(t)$ represents displacement of the head as a function of time, a represents the constant acceleration of the head, and t represents the duration for which the head has been accelerated.

During the operation of a seek operation, the servomechanism is excited with a square-wave feedforward signal, with the positive portion of the square-wave correlating to a period of acceleration, and the negative portion correlating a period of deceleration. Since acceleration of the servomechanism is proportional to the current driving it, it follows that the servomechanism would experience a period of constant acceleration followed by a period of constant deceleration, when excited by a square-wave. Seek operations of varying track lengths are driven by square-wave feedforward signals of varying pulse widths. Accordingly, $t_0$ can be thought of as a point in time at which the positive portion of a square-wave (correlating to acceleration) begins, and $t_1$ and $t_2$ can be thought of as two possible points at which the positive portion of the square-wave ends (and deceleration begins). Hence, time period $t_0$–$t_1$ can be thought of as the positive portion of one possible square-wave feedforward signal, while the time period $t_0$–$t_2$ can be thought of as the positive portion of a another possible square-wave feedforward signal.

Accepting the aforementioned conceptualization of time periods $t_0$–$t_1$ and $t_0$–$t_2$, it can be seen that the series representing expected head velocity for time period $t_0$–$t_1$ is a subset of the series representing the expected head velocity for the longer period, $t_0$–$t_2$. Likewise, the series representing the expected head displacement for time period $t_0$–$t_1$ is a subset of the series representing the expected head displacement for time period $t_0$–$t_2$. As can be seen by FIG. 3, this relationship is true for any displacement or velocity series spanning a period of time subsumed by a second, encompassing time period.

In summary, it can be seen from FIG. 3, that the state of a body experiencing constant acceleration can be expressed according to the relationships $v=at$ and $x=\frac{1}{2}at^2$ (assuming no initial velocity). For a given level of acceleration, the progression of each state variable—velocity and displacement—can be determined by using a sequence of consecutive time values ($t=1$, $t=2$, . . . ). Accordingly, both the progression of velocity and the progression of displacement can be succinctly expressed in a single pre-calculated table that is at least as long as the longest period of constant acceleration for which a state must be determined. Hence, a single velocity series and a single displacement series may be stored, such that for any given positive portion of a square-wave feedforward signal, the expected velocity or displacement response can be expressed as a subset (or multiple thereof) of the corresponding stored series. This is desirable because there exists no need to store separate trajectory series for each possible pulse width of the feedforward signal.

FIG. 4 illustrates the expected time-domain progression of displacement and velocity of the head during two different periods of sinusoidal acceleration. The two periods of acceleration are labeled "acceleration-1" and "acceleration-2." Each acceleration series adheres to the relationship $a(t)=\sin(\omega t)$, except that the series labeled "acceleration-2" has a frequency one-half of that possessed by the series labeled "acceleration-1," and would be used to control a seek operation traversing twice as many tracks. Although the specific acceleration series depicted in FIG. 4 are sinusoidal, the principles discussed below are pertinent to excitation of a servomechanism by any band-limited feedforward signal.

In FIG. 4, the series labeled "velocity-1" represents the expected velocity of the head corresponding to the acceleration series labeled "acceleration-1," and the series labeled "velocity-2" represents the expected velocity of the head corresponding to the acceleration series labeled "acceleration-2." Each velocity series is governed by the relationship $v(t)=1/\omega[\cos(\omega t)]$, wherein $v(t)$ represents the velocity of the head as a function of time, $\omega$ represents the frequency of the pulse width, and t represents the duration for which the head has been accelerated. Displacement is governed by the relationship $x(t)=1/\omega[t-1/\omega\sin(\omega t)]$, wherein $x(t)$ represents displacement of the head as a function of time, $\omega$ represents the frequency of the pulse width, and t represents the duration for which the head has been accelerated.

As can be seen in FIG. 4, it is not possible to express a velocity series corresponding to a given period of acceleration as a subset of a velocity series corresponding to a second, encompassing period of acceleration if the acceleration is band limited. To illustrate, at time t, it can be seen that the velocity corresponding to "acceleration-1" is $v_1$, and the velocity corresponding to "acceleration-2" is $v_2$, but $v_1 \neq v_2$. The same can be said of the displacement series corresponding to the two periods of acceleration. The ramification of the inability to express either a displacement or velocity series as a subset of another such series corresponding to a second, encompassing period of acceleration is that in order for a control system to yield these series for each period of band-limited acceleration, a separate series corresponding to each duration of acceleration would have to be stored.

Although band-limited acceleration poses the difficulty of seemingly requiring the storage of separate velocity or displacement series corresponding to each possible duration of acceleration, it is nonetheless desirable to restrict the high frequency bands of head acceleration due to the aforementioned issues of mechanical resonation and acoustic noisiness associated with high frequencies (such as those found in square waves).

To summarize the significance of the expected displacement series and the expected velocity series, the values contained within these series are to be used as trajectories. Trajectories are those values upon which the control loop is to be closed, and represent the expected response of a system to a given stimulus. Since the control system will need to be supplied with trajectories throughout a seek operation, and since it is preferable in some instances to be able to provide these trajectories without consuming processor bandwidth, it is desirable to be able to express these trajectories as a single set (applicable to any length of seek) of pre-calculated values, which can simply be retrieved from a table stored in a memory device for supply to the control loop.

FIG. 5 illustrates an apparatus for exciting a servomechanism with a low-frequency feedforward signal (corresponding to low frequency acceleration), yet necessitating the storage of but a single expected velocity and a single expected displacement series. Control system 200 possesses a drive model 202. The drive model 202 is a module that receives a square-wave feedforward signal (the signal which functions as the system's motive force), and returns both the expected positional data of the head and the expected velocity of the head in response to the servomechanism 204 having been excited by the square-wave feedforward signal.

In one embodiment of the drive model 202, the positional data returned by the drive model 202 differs based upon whether the head is experiencing acceleration or deceleration. During acceleration, the positional data indicates the expected displacement of the head. During deceleration, the positional data represents the distance of the head from its destination track. The drive model 202 possesses a stored sequence of expected positional data adhering to the relationship $x=\frac{1}{2} t^2$, wherein x represents the distance of the head from some point of reference, and t represents time measured from some point of reference. During acceleration, the point of reference from which the positional information is measured is the origin of the head upon commencement of the seek operation, and the point of reference from which time is measured is the point in time at which the seek operation commenced. During deceleration, however, the point of reference from which the positional information is measured is the destination track, and the point of reference from which time is measured is the point in time at which the seek operation is to conclude. The drive model 202 also possesses a stored sequence of expected velocity data adhering to the relationship v=t, wherein v represents the expected velocity of the head, and t represents time measured from some point of reference. During acceleration, the point of reference from which time is measured is the point in time at which the seek operation commenced. During deceleration, the point of reference from which time is measured is the point in time at which the seek operation is to conclude. Accordingly, using time measured as described above, the stored sequence of expected positional and velocity data may be accessed to produce a figure that when multiplied by the acceleration rate indicated by the square-wave feedforward signal yields the desired expected positional and velocity data.

The above described embodiment of the drive model 202 is but one of a set of possible embodiments. The requirements for selecting a given embodiment of a drive model 202 are that the drive model 202 represent the ideal response of the servomechanism to a hypothetical stimulus, and that the drive model 202 return expected response data that is measured from the same point of reference as the data returned from the equipment measuring the actual response servomechanism 204. The responses modeled by the drive model 202 may consist of positional information and any of its derivatives—velocity, acceleration, etc. It is understood that the drive model 202 may be constructed of a microprocessor and a memory device cooperating to function as described above. The drive model 202 may be embodied within the circuitry of a microprocessor executing the above stated set of equations which simulate the response of a system to a given stimulus.

The square-wave feedforward signal 206 provided to the drive model 202 is also provided to a low pass-filer 206. The low-pass filter 206 is designed with characteristics sufficient to attenuate the high frequency bands of the square-wave, because the high frequency components are associated with mechanical resonance and acoustic noisiness. The output of the low-pass filter 206 is provided as a first input to an adder 208, the output of which is used to drive the servomechanism 204.

A measuring module 210 is connected to the output of the adder 208 and also connected to the servomechanism. The measuring module yields information regarding the position of the head and also yields information regarding the various derivatives of head position. The output of the measuring module 210 is fed to the error signal-generating module 212.

In one embodiment of the measuring module 210, the measuring module possesses both an estimator 214 and a transducer 216. The transducer 216 is connected to the servomechanism 204 and yields an electrical signal indicative of head position. This signal is both an output of the measuring module and an input for the estimator 214, which also receives the output from the adder 208 as an input. The estimator 214, which yields head velocity (first derivative of head position), uses its two inputs in concert to remove the phase lag that would occur if the first derivative were computed simply as a backwards difference of the position data provided by the transducer 216. The head velocity is also provided as an output of the measuring module.

The particular embodiment of the measuring module 210 in FIG. 5 discloses a measuring module which produces head position and head velocity as outputs. Alternately, a measuring module may produce as outputs head position and an infinite number of derivatives thereof (head velocity, head acceleration, etc.).

A low-pass filter module 218 connects to the drive model 202. The low-pass filter module receives the expected response data and filters it, removing the high frequency components. The resulting data is the expected response of the system to the low frequency stimulus—the signal which actually drives the servomechanism 204.

In the particular embodiment shown in FIG. 5, the low-pass filter module is provided with two forms of expected response data, expected head position and head velocity. A low-pass filter 220, 222 is provided for each expected response sequence. Each low-pass filter 220, 222 possesses the same characteristics as low-pass filter 206. Alternately, the low-pass filter module 218 may be provided with expected response data consisting of expected position data and data indicative of any number of its derivatives (expected velocity, expected acceleration, etc.). Means for low-pass filtering each sequence of data provided to the low-pass filter module 218 is to be provided by the low-pass filter module 218.

The error signal-generating module 212 receives, as inputs, the data provided from the low-pass filter module 218 and the data provided from the measuring module 210. The error signal-generating module 212 subtracts a measured datum from its corresponding expected datum, yielding an error signal as an output.

In the particular embodiment depicted in FIG. 5, the error signal-generating module 212 is provided with two forms of expected response data, expected head position and expected head velocity. The error signal-generating module 212 is also provided with two forms of measured data, measured head position and measured head velocity. A subtracter 224, 226 is provided for each data set pair that is provided, producing a corresponding error signal for each data set pair. Alternately, the error signal-generating module 212 may receive a data set pair for any number of derivatives of head position, a corresponding subtracter (such as 224 or 226) for generating an error signal for each data set pair being provided.

The compensator module 228 receives the various error signals generated by the error signal-generating module 212. The compensator module 228 multiplies each error signal by a constant chosen to achieve system stability.

In the particular embodiment depicted in FIG. 5, the compensator module 228, known as a "state feedback controller," is provided with two forms error signal—one representing the error in head position, and the other representing the error in head velocity. Two scalers 230, 232 are provided, one for each form of error signal provided to the compensator module. Any number of error signals, each corresponding to head position or one of its infinite derivatives could be provided to the compensator module, and a corresponding scaler (such as 230 or 232) would be provided and chosen so as to achieve system stability. Each output of the compensator module 228 is provided as an input to adder 208, for the purpose of adjusting the filtered feedforward stimulus.

The drive model 202, low pass filter module 218, error signal generating module 212, compensator 228, measuring module 210, low pass filter 206, and adder 208 can all be implemented in firmware. Accordingly, these units may be embodied within the circuitry of a microprocessor. Alternately, these units can be embodied as discrete electronic components.

FIG. 6 illustrates a method for controlling the excitation of a servomechanism in a disc drive with a low frequency stimulus, yet not necessitating the inclusion of a model of the servomechnism's response to the low frequency stimulus. The method commences with low-pass filter operation 300 attenuating the high frequency bands of the stimulus intended to excite the servomechanism. Excitation operation 302 then accelerates the servomechanism at a rate proportional to the filtered stimulus. This step may be accomplished by driving the servomechanism with a current proportional to the filtered stimulus.

Measurement operation 304 determines the servomechanism's actual response, at intervals, to having been excited with the filtered stimulus. The responses to be determined in this step may include head position or any of its derivatives (velocity, acceleration, etc.). For example, head position and head velocity may be measured. Certain of these responses may be directly measured by transduction (such as head position), while others may be estimated based upon knowledge of the stimulus used to excite the servomechanism and knowledge of the responses which were directly measured. For instance, head velocity may be estimated based upon knowledge of the stimulus used to excite the servomechanism and based upon knowledge of the measured head displacement.

Modeling operation 306 predicts the servomechanism's various responses to having been excited with the unfiltered stimulus. Again, the responses to be predicted in this step may include head position or any of its derivatives (velocity, acceleration, etc.). Typically, the responses to be modeled are the same responses which are obtained in measurement operation 304. For instance, expected head position and expected head velocity may be the predicted responses assuming the same responses were measured in measurement operation 304.

Modeling operation 306 may consist of sub-operations, wherein the expected responses are predicted in one operation during a period of acceleration, but are predicted in a second operation during a period of deceleration. For example, during acceleration, expected head velocity may be determined as a function of time elapsed since the commencement of head acceleration, using such a time value as an index to access a velocity value in a memory table. However, during deceleration, expected head velocity may be determined as a function of time remaining until the head comes to rest in its desired track location, using such a time value as an index to access a velocity value in a memory table. The looked-up velocity values may need to be scaled by the level of the stimulus to properly reflect expected head velocity.

Similarly, during acceleration, expected head position may be determined as a function of time elapsed since the commencement of head acceleration, using such a time value as an index to access a displacement value in a memory table. However, during deceleration, expected head position may be determined as a function of time remaining until the head comes to rest in its desired track location, using such a time value as an index to access a position value in a memory table. During deceleration, the expected position value may be reflective of the head's expected distance from its desired location, rather than expected head displacement. Again, the looked-up position values may need to be scaled by the level of the stimulus to properly reflect expected head position.

In low-pass filter operation 308, the modeled expected responses predicted in operation 306 are low-pass filtered with a filter possessing the same characteristics as the one employed in operation 300. The result of this operation is that the various responses of the system to having been excited with the filtered, low frequency stimulus are predicted, although the only stored expected responses of the system relate to system response to a high frequency stimulus. It is possible to perform this operation with a single low-pass filter employed upon each expected response, or multiple low-pass filters may be used—one for each expected response to be filtered.

Finally, in adjustment operation 310, the filtered, low frequency stimulus is altered based upon the differences exiting between the various modeled expected system responses and their measured counterparts. This adjustment operation may be accomplished by calculating the difference between a specific modeled expected system response and its measured counterpart—for example, the difference between expected head velocity and measured head velocity, or the difference between expected head position and measured head position—and multiplying it by a constant. This would be performed for each system response that was both measured and modeled. The resulting products would be added to the filtered stimulus, thereby adjusting it.

To summarize preferred embodiments of the present invention, an apparatus for exciting a servomechanism with a low-frequency feedforward signal (corresponding to low frequency acceleration), yet necessitating the storage of but a single expected velocity and a single expected displacement series consists of the following. A control system (such as 200) possesses a drive model (such as 202). The drive model (such as 202) is a module that receives a square-wave feedforward signal (the signal which functions as the system's motive force), and returns both the expected positional data of the head and the expected velocity of the head in response to the servomechanism (such as 204) having been excited by the square-wave feedforward signal.

In one embodiment of the drive model (such as 202), the positional data returned by the drive model (such as 202) differs based upon whether the head is experiencing acceleration or deceleration. During acceleration, the positional data indicates the expected displacement of the head. During deceleration, the positional data represents the distance of the head from its destination track. The drive model (such as 202) possesses a stored sequence of expected positional data adhering to the relationship $x=\frac{1}{2} t^2$, wherein x represents the distance of the head from some point of reference, and t represents time measured from some point of reference. During acceleration, the point of reference from which the positional information is measured is the origin of the head upon commencement of the seek operation, and the point of reference from which time is measured is the point in time at which the seek operation commenced. During deceleration, however, the point of reference from which the positional information is measured is the destination track, and the point of reference from which time is measured is the point in time at which the seek operation is to conclude. The drive model (such as 202) also possesses a stored sequence of expected velocity data adhering to the relationship $v=t$, wherein v represents the expected velocity of the head, and t represents time measured from some point of reference. During acceleration, the point of reference from which time is measured is the point in time at which the seek operation commenced. During deceleration, the point of reference from which time is measured is the point in time at which the seek operation is to conclude. Accordingly, using time measured as described above, the stored sequence of expected positional and velocity data may be accessed to produce a figure that when multiplied by the acceleration rate indicated by the square-wave feedforward signal yields the desired expected positional and velocity data.

The square-wave feedforward signal (such as 206) provided to the drive model (such as 202) is also provided to a low pass-filer (such as 206). The low-pass filter (such as 206) is designed with characteristics sufficient to attenuate the high frequency bands of the square-wave, because the high frequency components are associated with mechanical resonance and acoustic noisiness. The output of the low-pass filter (such as 206) is provided as a first input to an adder (such as 208), the output of which is used to drive the servomechanism (such as 204).

A measuring module (such as 210) is connected to the output of the adder (such as 208) and also connected to the servomechanism. The measuring module yields information regarding the position of the head and also yields information regarding the various derivatives of head position. The output of the measuring module (such as 210) is fed to the error signal-generating module (such as 212).

In one embodiment of the measuring module (such as 210), the measuring module possesses both an estimator (such as 214) and a transducer (such as 216). The transducer (such as 216) is connected to the servomechanism (such as 204) and yields an electrical signal indicative of head position. This signal is both an output of the measuring module and an input for the estimator (such as 214), which also receives the output from the adder (such as 208) as an input. The estimator (such as 214), which yields head velocity (first derivative of head position), uses its two inputs in concert to remove the phase lag that would occur if the first derivative were computed simply as a backwards difference of the position data provided by the transducer (such as 216). The head velocity is also provided as an output of the measuring module.

A low-pass filter module (such as 218) connects to the drive model (such as 202). The low-pass filter module receives the expected response data and filters it, removing the high frequency components.

In one embodiment, the low-pass filter module is provided with two forms of expected response data, expected head position and head velocity. A low-pass filter (such as 220, 222) is provided for each expected response sequence. Each low-pass filter (such as 220, 222) possesses the same characteristics as low-pass filter (such as 206).

The error signal-generating module (such as 212) receives, as inputs, the data provided from the low-pass filter module (such as 218) and the data provided from the measuring module (such as 210). The error signal-generating module (such as 212) subtracts a measured datum from its corresponding expected datum, yielding an error signal as an output.

In one embodiment, the error signal-generating module (such as 212) is provided with two forms of expected response data, expected head position and expected head velocity. The error signal-generating module (such as 212) is also provided with two forms of measured data, measured head position and measured head velocity. A subtracter (such as 224, 226) is provided for each data set pair that is provided, producing a corresponding error signal for each data set pair.

The compensator module (such as 228) receives the various error signals generated by the error signal-generating module (such as 212). The compensator module (such as 228) multiplies each error signal by a constant chosen to achieve system stability.

In one embodiment, the compensator module (such as 228) is provided with two forms error signal—one representing the error in head position, and the other representing the error in head velocity. Two scalers (such as 230, 232) are provided, one for each form of error signal provided to the compensator module.

A method for controlling the excitation of a servomechanism in a disc drive with a low frequency stimulus, yet not necessitating the inclusion of a model of the servomechnism's response to the low frequency stimulus can be achieved by performing the following steps The method commences with a low-pass filter operation (such as 300), attenuating the high frequency bands of the stimulus intended to excite the servomechanism. Excitation operation 302 then accelerates the servomechanism at a rate proportional to the filtered stimulus This step may be accomplished by driving the servomechanism with a current proportional to the filtered stimulus.

A measurement operation (such as 304) determines the servomechanism's actual response, at intervals, to having been excited with the filtered stimulus. Head position and head velocity may be measured. Certain of these responses may be directly measured by transduction (such as head position), while others may be estimated based upon knowledge of the stimulus used to excite the servomechanism and knowledge of the responses which were directly measured. For instance, head velocity may be estimated based upon knowledge of the stimulus used to excite the servomechanism and based upon knowledge of the measured head displacement.

A modeling operation (such as 306) predicts the servomechanism's various responses to having been excited with the unfiltered stimulus. Expected head position and expected head velocity may be modeled. The modeling operation (such as 306) may consist of sub-operations, wherein the expected responses are predicted in one operation during a period of acceleration, but are predicted in a second operation during a period of deceleration. For example, during acceleration, expected head velocity may be determined as a function of time elapsed since the commencement of head acceleration, using such a time value as an index to access a velocity value in a memory table. However, during deceleration, expected head velocity may be determined as a function of time remaining until the head comes to rest in its desired track location, using such a time value as an index to access a velocity value in a memory table. The looked-up velocity values may need to be scaled by the level of the stimulus to properly reflect expected head velocity.

Similarly, during acceleration, expected head position may be determined as a function of time elapsed since the commencement of head acceleration, using such a time value as an index to access a displacement value in a memory table. However, during deceleration, expected head position may be determined as a function of time remaining until the head comes to rest in its desired track location, using such a time value as an index to access a position value in a memory table. During deceleration, the expected position value may be reflective of the head's expected distance from its desired location, rather than expected head displacement. Again, the looked-up position values may need to be scaled by the level of the stimulus to properly reflect expected head position.

In a low-pass filter operation (such as 308), the modeled expected responses predicted in the modeling operation (such as 306) are low-pass filtered with a filter possessing the same characteristics as the one employed in the first low-pass filter operation (such as 300). It is possible to perform this operation with a single low-pass filter employed upon each expected response, or multiple low-pass filters may be used—one for each expected response to be filtered.

Finally, in an adjustment operation (such as 310), the filtered, low frequency stimulus is altered based upon the differences exiting between the various modeled expected system responses and their measured counterparts. This adjustment operation may be accomplished by calculating the difference between a specific modeled expected system response and its measured counterpart—for example, the difference between expected head velocity and measured head velocity, or the difference between expected head position and measured head position—and multiplying it by a constant. The resulting products would be added to the filtered stimulus, thereby adjusting it.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A method for controlled excitation of a servomechanism, possessing a head mounted on its distal end, in a disc drive with a low frequency signal, without necessitating the inclusion of a model of the servomechanism's response to the low frequency signal, comprising:

a) filtering, with a first low-pass filter, a high frequency input signal, yielding a filtered input signal;

b) exciting the servomechanism with the filtered input signal;

c) measuring at intervals the responses of the servomechanism to the filtered input signal, yielding measured responses;

d) modeling responses of the servomechanism to the high frequency input signal, yielding modeled responses;

e) filtering the modeled responses of the servomechanism with a low-pass filter, yielding filtered modeled responses; and f) adjusting the filtered input signal based upon the difference between the filtered modeled responses and the measured responses of the servomechanism.

2. The method of claim 1 wherein step b) further comprises driving the servomechanism with a current proportional to the filtered input signal.

3. The method of claim 1 wherein step c) further comprises:

g) measuring, at intervals, the velocity of the head; and h) measuring, at intervals, the displacement of the head.

4. The method of claim 3 wherein step g) further comprises estimating the velocity of the head based upon the adjusted input signal and upon the measured displacement of the head.

5. The method of claim 1 wherein step d) further comprises:

g) modeling the velocity that the head would have experienced in response to the servomechansim being excited with the unfiltered, high frequency input signal; and h) modeling the distance the head would have traveled in response to the servomechansim being excited with the unfiltered, high frequency input signal.

6. The method of claim 5 wherein step g) further comprises the steps of:

i) while the head is experiencing acceleration, using elapsed time since commencement of acceleration as an index to look up from a stored set of velocity trajectories for the acceleration phase the velocity that the head would have experienced in response to the servomechanism being excited with the unfiltered, high frequency input signal; and j) while the head is experiencing deceleration, using time until head comes to rest as an index to look up from a stored set of velocity trajectories for the deceleration phase the velocity that the head would have experienced in response to the servomechanism being excited with the unfiltered, high frequency input signal.

7. The method of claim 6 wherein step i) further comprises the steps of:

k) using elapsed time since commencement of acceleration as an index to look up, from a stored set of velocity trajectories for the acceleration phase, a value proportional to the velocity that the head would have experienced in response to the servomechanism being excited with the unfiltered, high frequency input signal; and l) scaling the value of step k) to attain the velocity that the head would have experienced in response to the servomechanism being excited with the unfiltered, high frequency input signal.

8. The method of claim 6 wherein step j) further comprises the steps of:

k) using time until head comes to rest as an index to look up, from a stored set of velocity trajectories for the deceleration phase, a value proportional to the velocity that the head would have experienced in response to the servomechanism being excited with the unfiltered, high frequency input signal; and l) scaling the value of step k) to attain the velocity that the head would have experienced in response to the servomechanism being excited with the unfiltered, high frequency input signal.

9. The method of claim 5 wherein step h) further comprises:

i) while the head is experiencing acceleration, using elapsed time since commencement of acceleration as an index to look up from a stored set of displacement trajectories for the acceleration phase the distance the head would have traveled in response to the servomechanism being excited with the unfiltered, high frequency input signal; and j) while the head is experiencing deceleration, using time until head comes to rest as an index to look up from a stored set of displacement trajectories for the deceleration phase the distance the head would have been from its desired location in response to the servomechanism being excited with the unfiltered, high frequency input signal.

10. The method of claim 9 wherein step i) further comprises:

k) using elapsed time since commencement of acceleration as an index to look up from a stored set of displacement trajectories for the acceleration phase a value proportional to the distance the head would have traveled in response to the servomechanism being excited with the unfiltered, high frequency input signal; and l) scaling the value of step k) to attain the distance the head would have traveled in response to the servomechanism being excited with the unfiltered, high frequency input signal.

11. The method of claim 9 wherein step j) further comprises:

k) using time until head comes to rest as an index to look up from a stored set of displacement trajectories for the deceleration phase a value proportional to the distance the head would have been from its desired location in response to the servomechanism being excited with the unfiltered, high frequency input signal; and l) scaling the value of step k) to attain the distance the head would have been from its desired location in response to the servomechanism being excited with the unfiltered, high frequency input signal.

12. The method of claim 1 wherein step e) further comprises the step of filtering the modeled responses of the servomechanism with the first low-pass filter, yielding filtered modeled responses.

13. The method of claim 1 wherein step e) further comprises the step of filtering the modeled responses of the servomechanism with a low-pass filter possessing the same characteristics as the first low-pass filter, yielding filtered modeled responses.

14. The method of claim 1 wherein step f) further comprises the steps of:

g) subtracting a measured displacement datum from a modeled displacement datum, yielding a displacement error quantity;

h) subtracting a measured velocity datum from a modeled velocity datum, yielding a velocity error quantity;

i) multiplying the displacement error quantity by a first constant, yielding a displacement error product;

j) multiplying the velocity error quantity by a second constant, yielding a velocity error product; and k) adding to the filtered input signal both the displacement error product and the velocity error product.

15. An apparatus for controlled excitation of a servomechanism, which moves a head mounted on its distal end, in a disc drive with a low frequency signal, comprising:

a) a first low-pass filter that filters a high frequency input signal, yielding a filtered input signal;

b) an adder that receives, as one of its inputs, the filtered input signal, with its output being operably connected to a driver and a first input of a measuring module;

c) the driver which drives the servomechanism;

d) the measuring module which measures the various responses of the servomechanism, and supplies a first input of an error signal-generating module;

e) a servomechanism model that receives the high frequency input signal, that models the various expected responses of the servomechanism, and that yields a modeled response output;

f) a low-pass filter module that receives the modeled response output, and that attenuates the high frequency bands, yielding a filtered modeled response output;

g) the error signal-generating module, with a second input receiving the filtered modeled response output, which calculates an error output which is provided as an input to a compensator; and h) the compensator which scales the error output from the error signal generating module, yielding a second input to the adder.

16. The apparatus of claim 15 wherein the driver comprises a power amplifier.

17. The apparatus of claim 15 wherein the servomechanism comprises a voice coil motor.

18. The apparatus of claim 15 wherein the measuring module further comprises:

i) a transducer operably coupled to the servomechanism, for producing via transduction a first output signal representing the position of the head; and j) an estimator, receiving as a first input the first output signal from the transducer, and receiving as a second input the output from the adder, and calculating the velocity of the head.

19. The apparatus of claim 18 wherein the servomechanism model further comprises:

i) a ROM pre-loaded with a set of head-velocity and a head-displacement trajectories; and j) a microprocessor operably connected to the ROM for determining, while the head experiences deceleration, the deceleration portions of the head-velocity and head-displacement models.

20. The apparatus of claim 19 wherein the modeled response output further comprises:

i) a modeled displacement signal; and j) a modeled velocity signal.

21. The apparatus of claim 20 wherein the low-pass filter module further comprises:

i) a second low-pass filter, possessing identical characteristics as the first low-pass filter, for receiving the modeled displacement signal, and yielding a filtered modeled displacement signal; and j) a third low-pass filter, possessing identical characteristics as the first low-pass filter, for receiving the modeled velocity signal, and yielding a filtered modeled velocity signal.

22. The apparatus of claim 21 wherein the error signal-generating module further comprises:
  i) a first subtractor, receiving the filtered modeled displacement signal as a minuend input, and receiving the first output of the measuring module as a subtrahend input, yielding the difference therebetween as a displacement error signal; and
  j) a second subtractor, receiving the filtered modeled velocity signal as a minuend input, and receiving the second output of the measuring module as a subtrahend input, yielding the difference therebetween as a velocity error signal.

23. The apparatus of claim 22 wherein the compensator further comprises:
  i) a first scaler receiving the displacement error signal, and scaling the signal by a first constant, yielding an output which is provided as a second input to the adder; and
  j) a second scaler receiving the velocity error signal, and scaling the signal by a second constant, yielding an output which is provided as a third input to the adder.

24. The apparatus of claim 15 wherein the servomechanism model comprises a microprocessor calculating in real-time the modeled response output.

25. A control system that models a response of a servomechanism to a low frequency stimulus, the response being linear with respect to the spectral content of the low frequency stimulus, the method not necessitating storage of the system response to the low frequency stimulus, comprising:
  a) a servomechanism; and
  b) a means for determining, from a stored model of the response of the servomechanism to a high frequency stimulus, the response of the servomechanism to a low frequency stimulus, and thereby controlling the excitation of the servomechanism so as to cause the servomechanism to respond in a manner closely approximating the determined response of the servomechanism to the low frequency stimulus.

* * * * *